United States Patent
Kohtani

[15] 3,703,041
[45] Nov. 21, 1972

[54] MAGNETIC TEACHING MACHINE WITH SELECTIVELY OPERABLE REPETITIVE AND NON-REPETITIVE LEARNING MODES

[72] Inventor: Yutaka Kohtani, Tokyo, Japan

[73] Assignee: Canon Kabushiki Kaisha, Shimomaruko, Tokyo, Japan

[22] Filed: Sept. 11, 1970

[21] Appl. No.: 71,514

[30] Foreign Application Priority Data

Sept. 20, 1969 Japan ..................... 44/74987

[52] U.S. Cl.....35/35 C, 179/100.2 MD, 179/100.2 S
[51] Int. Cl..............................G09b 5/04, G11b 5/86
[58] Field of Search ............ 179/100.2 MD, 100.2 S; 35/35 C

[56] References Cited

UNITED STATES PATENTS

| 3,059,348 | 10/1962 | Mezzacappa | 35/35 C |
| 3,484,955 | 12/1969 | Lippert | 35/35 C |
| 3,323,230 | 6/1967 | Cooper | 35/35 C |

Primary Examiner—Bernard Konick
Assistant Examiner—Robert S. Tupper
Attorney—Ward, McElhannon, Brooks and Fitzpatrick

[57] ABSTRACT

An magnetic recording apparatus comprises a magnetic tape and an endless magnetic recording medium. The former carries information signals such as auditory teaching materials recorded upon the first track at a predetermined interval and control signals recorded upon the second track. In reproducing the information signals, they are reprinted or transferred upon the endless magnetic recording medium which has the length substantially equal to the length of the information signal record plus the length of the spacing between two adjacent information signals recorded in the first track of the magnetic tape. After the transfer of the information signals from the magnetic tape to the endless recording medium a student may record his imitation upon the endless recording medium. Thus, the information such as teaching materials and imitation recorded upon the endless recording medium may be repetitively reproduced if desired.

5 Claims, 4 Drawing Figures

MAGNETIC TEACHING MACHINE WITH SELECTIVELY OPERABLE REPETITIVE AND NON-REPETITIVE LEARNING MODES

BACKGROUND OF THE INVENTION

The present invention relates to a magnetic recording apparatus and more particularly a magnetic recording apparatus for use in learning a foreign language, music and the like or for use as a teaching machine.

Magnetic tapes are widely used for students to reproduce the previously recorded auditory teaching materials for effective studies of foreign languages, music and the like. Since the recording and reproduction by the magnetic tapes are very simple in operation, the students may listen repetitively one auditory teaching material, imitate and record. It is well known that memories and skills are much improved by repetition in learning a language, music and the like. For example, skills in speaking a foreign language may be much improved by completely memorizing one sentence with intonation rather than by memorizing the individual words and phrases of this sentence by repetitively listening and imitating the production of word voice and speech sounds. In general, the beginners first memorize short sentences and then longer sentences as their skill is improved. This is the most effective method in learning a foreign language.

However, the magnetic recording and reproducing machines are in general complex in operation for repetitive reproduction of one auditory teaching material so that the students tend to find the repetitive reproduction unpleasant work. For instance in a magnetic recording and reproducing machine for learning a foreign language disclosed in U. S. Pat. No. 2,876,561, the previously recorded auditory teaching materials are reproduced and a student imitates the teaching materials and record upon a track reserved for practice or drills by the student. Thereafter, the magnetic tape is rewound and the mode for reproducing the track for practice or drills is selected so as to reproduce the student's imitation to compare with the teaching material. These steps are repetitively cycled. That is, the magnetic tape must be rewound by a predetermined length and the record and reproduce modes must be switched so that the student finds it very complex to operate the recording machine to learn a foreign language or the like, thus finding less interest in utilizing the tape recorder even though it is very effective in learning.

To overcome these difficulties, the Japanese Pat. Publication No. 16,828/1964 proposes a magnetic recording machine of the type in which upon completion of reproduction of one auditory teaching material and recording of its imitation by a student, the magnetic tape is automatically rewound by a predetermined length while the reproduce or playback mode is simultaneously selected so as to reproduce again the teaching material. However, this magnetic recording machine has a defect that its mechanism is complex. Furthermore, the magnetic tape upon which are recorded the auditory teaching materials is also provided with a track for recording the student's imitations for practice or drill so that there is a danger that the auditory teaching materials are erased. Furthermore, the service life of the magnetic tape is adversely affected because it is fast-rewound for repetitive learning. Since the magnetic tape is rewound by a predetermined length, it is impossible to increase an unit length of the auditory teaching material when the skill of the student is improved so that he wants to reproduce and imitate a longer speech. The magnetic recording machine of the type described may be used for repetitive learning or imitation but is not effective as a self-learning machine.

In the magnetic recording machine of the type disclosed in U. S. Pat. No. 3,059,348, an auditory teaching material recorded upon a main tape is reprinted upon an endless tape when the material is reproduced, and the student's imitation may be recorded also upon the endless tape. The endless tape may be repetitively reproduced for learning. However, the mode of playback and stop of the auditory teaching material magnetic tape and the mode of recording and playback of the endless tape must be selected repetitively so that the student tends to find it less interesting to use this magnetic recording machine.

When the previously reprinted auditory teaching material upon the endless tape is not completely erased before new teaching materials is reprinted, both of the teaching materials are reproduced so that student's learning may be adversely affected.

It is therefore one of the objects of the present invention to provide a magnetic recording apparatus which is very simple in operation and is best adapted to the repetitive learning cycle consisting of the step of understanding of an auditory teaching material reproduced (I), the step of imitating the teaching material (II), the step of comparison of the teaching material with the recorded imitation (III) and the step of recognizing the defects (IV).

Another object of the present invention is to provide a magnetic recording apparatus for use in learning a foreign language, music and the like in which only a desired auditory teaching material may be automatically repetitively reproduced.

Another object of the present invention is to provide a magnetic recording apparatus for use in learning a foreign language, music and the like in which while a desired auditory teaching material is automatically repetitively reproduced, the imitation by a student of the teaching material may be recorded and reproduced upon an endless magnetic tape.

The present invention will become more apparent from the following description of the preferred embodiment taken in conjunction with the acompanying drawing in which.

Figure 1:
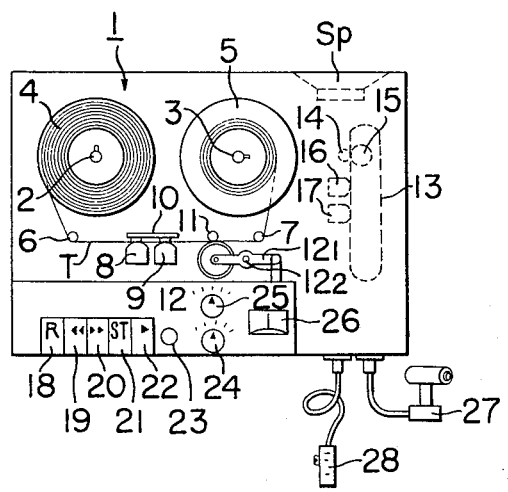
FIG. 1 is a front view of a magnetic recording and reproducing apparatus in accordance with the present invention.
Figure 3:
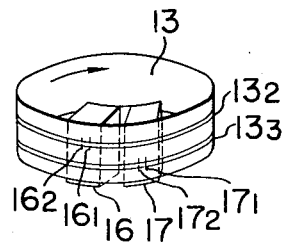
Figure 4:
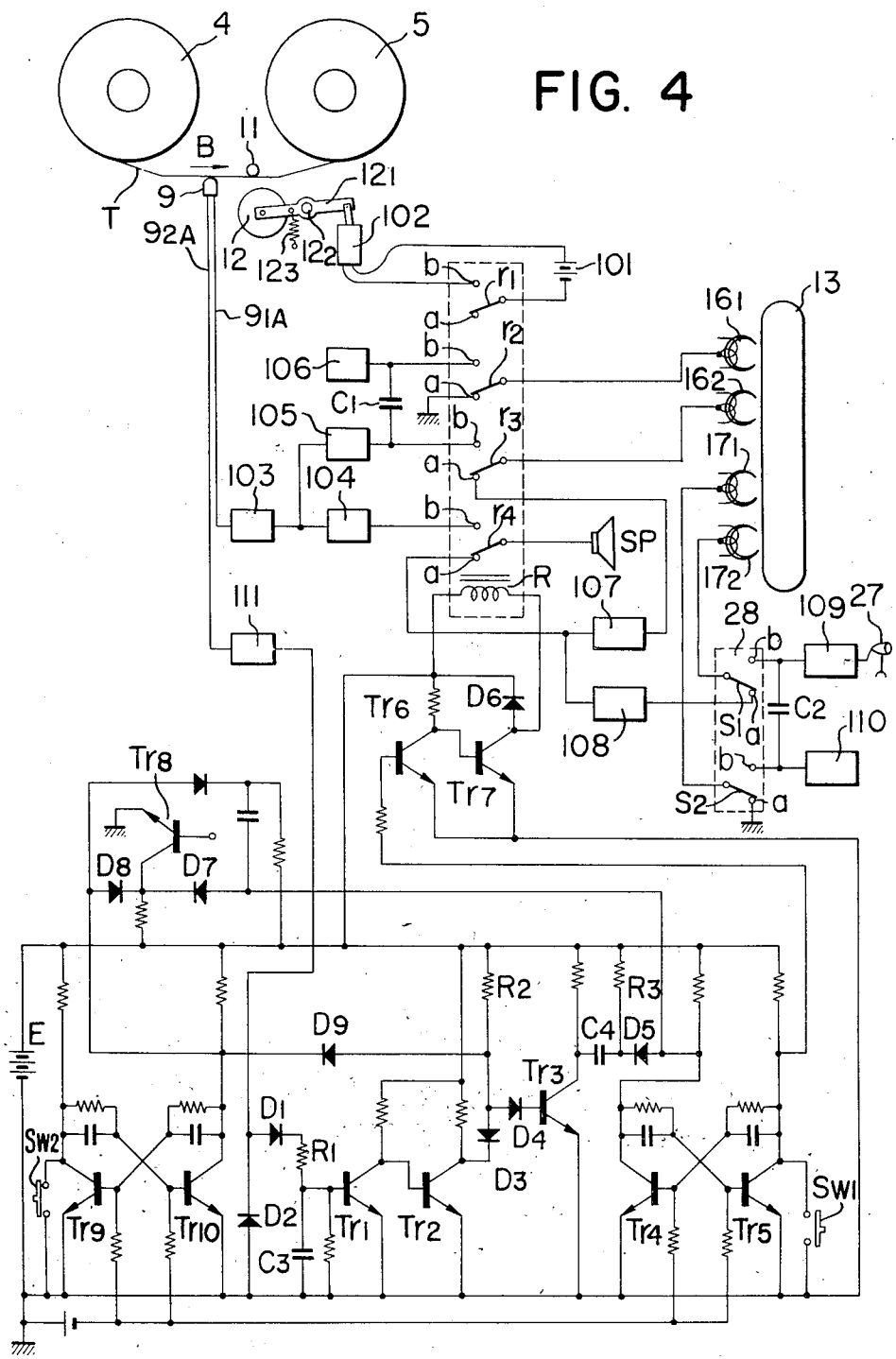

FIG. 3 is an enlarged, perspective view of an endless magnetic tape used in the present invention; and FIG. 4 is a circuit diagram of the apparatus shown in FIG. 1. Referring to FIG. 1, supply and take-up reels 4 and 5 are carried by reel-drive shafts 2 and 3 of a main body of a magnetic recording-reproducing apparatus, and a magnetic tape T is extended by the supply and take-up reels 4 and 5, which are applied with reel brakes (not shown) when stopped.

Figure 2:
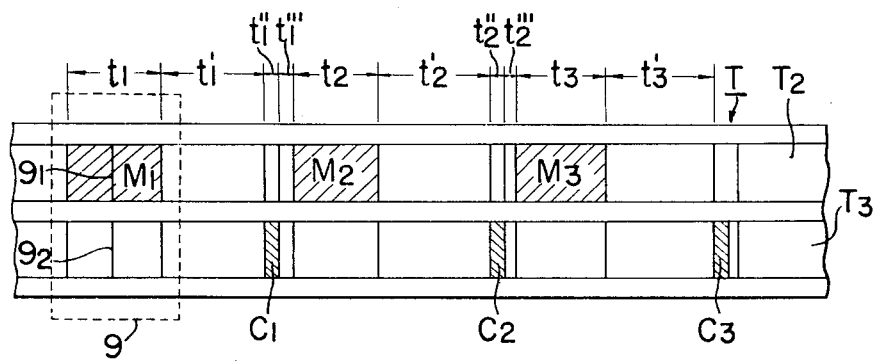
FIG. 2 is an enlarged, fragmentary view of a magnetic tape upon which are recorded auditory teaching materials.

As shown in FIG. 2, the speeches or the like to be imitated are recorded upon the tape T together with control signals. That is, the speeches or the like $M_1$, $M_2$ and so on are recorded on the track $T_2$ in equidistantly spaced-apart relation with each other while control signals $C_1$, $C_2$ and so on with a predetermined frequency are recorded on the track $T_3$. The control signals $C_1$, $C_2$ and so on are recorded immediately prior to the next adjacent speeches or the like $M_2$, $M_3$ and so on whose lengths are not required to be equal to each other, but in FIG. 2 they are shown as having the same length. When the speeches $M_1$, $M_2$ and so on are reproduced, they may be simultaneously reprinted or transferred on an auxiliary endless tape and they are spaced apart from each other by the unrecorded spacings whose lengths are substantially equal to those of the speeches or the like $M_1$, $M_2$ and so on.

Referring back to FIG. 1, reference numerals 6 and 7 designate tape guides; 8, an erasing head; and 9, a reproducing or playback head. The head 9 is provided with the gaps $9_1$ and $9_2$ for reproducing the tracks $T_2$ and $T_3$ respectively. Reference numeral 10 designates a pressure pad; and 11, a capstan driven at a constant speed by a driving mechanism (not shown) when a reproduction-button to be described hereinafter is depressed. Reference numeral 12 is a pinch roller carried rotatably by a pinch-roller-arm $12_1$ which is pivotably fixed by a pivot $12_2$. The pinch roller 12 is actuated by a plunger so as to be pressed against the capstan 11. Reference numeral 13 designates an endless tape incorporated in the main body 1; 14 and 15, a capstan and pinch roller for transporting the endless tape 13 respectively; and 16 and 17, magnetic heads for the endless tape 13. The heads 16 and 17 are the magnetic heads of three-in-one type and are provided with erasing and recording-reproducing heads $16_1$, $17_1$, $16_2$ and $17_2$. The relation of the magnetic heads 16 and 17 relative to the tape 13 is illustrated in FIG. 3. That is, the heads $16_1$ and $16_2$ are opposed to the upper track $13_2$ of the endless tape 13 while the magnetic heads $17_1$ and $17_2$, the lower track $13_3$.

A recording button 18 is depressed for recording the tape T; a button 19 for fast-rewinding; a button 20 is for fast-forwarding of the tape T; a button 21 is for stopping the tape; a button 22 is for reproducing; and a button 23 is for resetting. Upon depression of the reproduction button 22, the tapes T and 13 are transported by the capstans 11 and 14 respectively. When the reset button 23 is depressed, the reproduction button is kept depressed while a switch $SW_1$ to be described hereinafter is turned on so as to reproduce the tape T. Reference numerals 24 and 25 designate volumes for controlling the reproduction and recording levels; 26, an input level meter; 27, a microphone; 28, a remote switch; and SP, a loudspeaker.

As shown in FIG. 2, the reproduction time of the speeches or the like $M_1$, $M_2$ and so on are designated by $t_1$, $t_2$ and so on; the spacing or blank time, by $t_1'$, $t_2'$ and so on; the time interval of the control signals $C_1$, $C_2$ and so on, by $t_1''$, $t_2''$ and so on; and the spacing between the control signal and the starting edge of the speeches or the like, by $t_1'''$, $t_2'''$ and so on. Each of time intervals $T_1$, $T_2$ and so on from the beginning of one speech or the like to the beginning of the next succeeding speech or the like is substantially equal to each other. That is, $$T_1 = t_1 + t_1' + t_1'' + t_1''' \quad T_2 = t_2 + t_2' + t_2'' + t_2''' = \ldots = T_n.$$

Each of the time intervals $T_1$, $T_2$ and so on is equal to the time interval necessary to one revolution of the endless tape.

FIG. 4 illustrates the circuit diagram of the magnetic tape recording-reproducing apparatus shown in FIG. 1. The pinch roller arm $12_1$ is actuated by a plunger 102 which is connected to a contact $r_1$ of a relay to be described hereinafter in series with a DC source 101. The pinch roller arm $12_1$ is normally so biased under the force of a spring $12_3$ as to space the pinch roller 12 from the capstan 11, and is caused to be rocked in the clockwise direction against the spring $12_3$ when the plunger 102 is energized so that the pinch roller 12 is pressed against the capstan 11. The output terminal $9_1A$ of the magnetic head 9 for reproducing the speeches or the like $M_1$, $M_2$ and so on is connected to a preamplifier 103, a main amplifier 104 and a recording amplifier 105. The output of a high-frequency oscillator 106 is applied to output of the recording amplifier 105 through a capacitor $C_1$.

A relay to be actuated by the control signals recorded on the tape T, as will be described in more detail hereinafter, has contacts $r_1$, $r_2$, $r_3$ and $r_4$. That is, the relay R consists of four single-pole-double-through (SPDT) contacts, and the poles are switched from the contacts $a$ to the contacts $b$.

The fixed contact $b$ of the contact $r_2$ is connected to the output terminal of the high-frequency oscillator 106 while the fixed contact $a$ is grounded. The movable pole is connected to the erase head $16_1$ of the magnetic head 16. The fixed contact $b$ of the contact $r_3$ is connected to the output terminal of the recording amplifier 105 while the fixed contact $a$, to the input terminal of the reproduction amplifier 107. The movable pole is connected to the recording head $16_2$. The movable pole of the contact $r_4$ is connected to the loudspeaker SP, and the fixed contact $b$ is connected to the output terminal of the reproduction power amplifier 104 while the fixed contact $a$, to the output terminals of the reproduction amplifiers 107 and 108. Reference numeral 109 designates a recording amplifier; and 110, a high-frequency oscillator whose output is connected through the capacitor $C_2$ to the output terminal of the recording amplifier 109.

The movable contacts of switches $S_1$ and $S_2$ are switched from the fixed contacts $a$ to $b$ or vice versa by the remote switch 28 which is also illustrated in FIG. 1.

The control signals detected by the magnetic head $9_2$ are amplified by an amplifier 111. The current rectified by rectifying diodes $D_1$ and $D_2$ is smoothed by a smoothing circuit consisting of $C_3$ and $R_1$, which in turn is connected to NPN transistors $Tr_1$ and $Tr_2$ connected in cascade. The collector bias is supplied from a DC source E. A diode $D_3$ is connected to the collector of the transistor $Tr_2$, thereby forming a known logic circuit, the output of which is applied to a transistor $Tr_3$ through a diode $D_4$. A capacitor $C_4$ and a resistor $R_3$ constitutes a differentiation circuit for differentiating the collector output of the transistor $Tr_3$. The output of the differentiation circuit $C_4R_3$ is applied as trigger pulses to a flip-flop circuit consisting of transistors $Tr_4$ and $Tr_5$ through a diode $D_5$. Transistors $Tr_6$ and $Tr_7$ are switching transistors and the collector output of the transistor $Tr_7$ is applied to the relay R.

A diode $D_6$ connected to the relay R is for absorbing the transient voltage. A manual switch $SW_1$ is interposed between the collector of the transistor $Tr_5$ of the flip-flop circuit and the ground and may be closed to transport the tape independently of the control signals.

The collector of the transistor $Tr_8$, to the base of which is applied a positive pulse for a very short time interval when the power source is connected to a capstan driving motor and the electric circuit in synchronism with the depression of the reproduce button 22, is connected to the collector of the transistor $Tr_4$ of the flip-flop circuit through a diode $D_5$. The collector of the transistor $Tr_8$ is connected to that of a transistor $Tr_{10}$ of a flip-flop circuit consisting of the transistors $Tr_9$ and $Tr_{10}$ through a diode $D_8$ connected in parallel with the diode $D_7$. The transistor $Tr_8$ is also connected to the diode $D_9$ of the logic circuit. The switch $SW_2$ which is closed in unison with the reset button 23 when the repeat mode is selected is interposed between the collector and emitter of the transistor $Tr_9$ of the flip-flop circuit.

Next the mode of operation will be described hereinafter. Upon depression of reproduce button 22, both of the capstans 11 and 14 start to rotate by the driving mechanism (not shown). A positive polarity pulse is applied to the base of the transistor $Tr_8$, so that it is rendered conductive. The collector potential of the transistor $Tr_8$ is lowered so that the collector potentials of the transistors $Tr_4$ and $Tr_{10}$ are lowered through the diodes $D_7$ and $D_8$ respectively. The transistor $Tr_5$ is rendered non-conductive so that the collector potential thereof is maintained at a high level while the transistor $Tr_6$ is rendered conductive, whereby the transistor $Tr_7$ is rendered non-conductive. In consequence, the relay R is not energized so that the contacts $r_1$ to $r_4$ are maintained as shown in FIG. 4. That is, no current flows through the plunger 102 so that the tape T is not transported.

When the transistor $Tr_8$ is rendered conductive, the base potential of the transistor $Tr_9$ is lowered through the diode $D_8$ so that the transistor $Tr_9$ is rendered non-conductive. In consequence, the base potential of the transistor $Tr_{10}$ is raised so that the transistor $Tr_{10}$ is rendered conductive.

Upon depression of the reset button 23, the switch $SW_1$ is closed and the cooperative switch $SW_2$ is opened. Thus, the transistor $Tr_5$ is rendered conductive while the transistor $Tr_6$ is rendered non-conductive because the collector potential of $Tr_5$ is lowered, and the transistor $Tr_7$ is rendered conductive. In consequence, the actuating current flows from the power source E through the relay R and the transistor $Tr_7$ to the negative terminal of the power source E so that the movable poles are switched from the fixed contacts $a$ to $b$. In consequence, the plunger 102 is actuated so that the pinch roller 12 is pressed against the capstan 11 and the brakes applied to the reel driving motor are released. Thus, the main tape T is transported. The moving pole is switched to the fixed terminal $b$ in the contact $r_4$ so that the output of the reproduce head $9_1A$ of the magnetic head in contact with the track $T_2$ may be reproduced through the amplifiers 103 and 104 and the loudspeaker SP.

A part of the output $9_1A$ is amplified by the amplifier 105 and is superposed with the output from the high-frequency oscillator 106 and then applied to the magnetic head $16_2$. The erase head $16_1$ is juxtaposed in the direction A of the transport of the tape 13 with the magnetic head $16_2$ in contact with the track $13_2$ and is applied with the high-frequency erasing current because the movable pole is switched to the fixed contact $b$ in the contact $r_2$. In consequence, the endless tape 13 is erased by the erase head $16_1$ and then the output of the tape T is recorded upon the endless tape 13 by the magnetic head $16_2$.

When the button 23 is released, both of the switches $SW_1$ and $SW_2$ are brought into the normal condition as shown in FIG. 4. That is, the switch $SW_1$ is opened and the switch $SW_2$ is closed.

When one speech or the like is being reproduced by the magnetic head 9, no control signal output $9_2A$ is reproduced so that the transistor $Tr_1$ is rendered non-conductive while the transistor $Tr_2$ is maintained conductive, whereby the collector potential of the latter remains at a low level. In consequence, the diode $D_3$ is rendered conductive with its anode side remained at a low level so that the transistor $Tr_3$ remains non-conductive. In consequence, the collector potential of the transistor $Tr_3$ remains unchanged and no trigger pulse is applied to the flip-flop circuit consisting of the transistors $Tr_4$ and $Tr_5$ so that the relay R remains energized. Therefore, the tape T is reproduced and simultaneously reprinted on the endless tape 13.

When the control signal $C_1$ is reproduced after the speech or the like $M_1$ has been reproduced, it is amplified by the amplifier 111, rectified by the diodes $D_1$ and $D_2$ and applied to the base of the transistor $Tr_1$ as the positive bias signal through the smoothing circuit $R_1C_2$. In consequence, the transistor $Tr_1$ is rendered conductive while the transistor $Tr_2$ is rendered non-conductive so that the collector potential of the transistor $Tr_2$ is raised, thereby rendering the diode $D_3$ non-conductive. Since the diode $D_5$ is also non-conductive as is the diode $D_3$, the base potential of the transistor $Tr_3$ is raised, thereby rendering the latter into conductive state.

Upon conduction of the transistor $T_3$, the variation in the collector potential of the transistor $Tr_3$ is differentiated by the differentiation circuit $C_4R_3$ so that the negative polarity pulses are applied through the diode $D_5$ to the base of the transistor $Tr_5$. In consequence, the transistor $Tr_4$ is rendered conductive while the transistor $Tr_5$ is rendered non-conductive. The transistor $Tr_7$ is also rendered non-conductive through the transistor $Tr_6$. In consequence, the relay R is de-energized, that is the movable poles are switched from the fixed contacts $b$ to $a$.

Consequently, the plunger 102 is deenergized so that the pinch roller 12 is moved away from the capstan 11 and the brakes are applied to the reels 4 and 5, whereby the transport of the main tape T is stopped.

The signals reprinted on the track $13_2$ of the auxiliary endless tape 13 are repetitively reproduced by the magnetic head $16_2$, the amplifier 107 and the loudspeaker SP. The erase and record reproduce head $17_1$ and $17_2$ are juxtaposed with each other in contact with the track $13_3$ of the auxiliary endless tape 13. When a student imitates the speeches or the like reprinted on the endless tape 13 and then switches the movable contacts $S_1$ and $S_2$ in the selection switch 28 from the fixed con- $^{tacts}$ a to b, his voice may be recorded upon the track $13_3$ with the high-frequency bias from the oscillator 110.

In order to compare his imitated speech with the speech or the like recorded upon the endless tape 13, the movable contacts $S_1$ and $S_2$ in the selection switch 28 are switched from the fixed contacts b to a as shown in FIG. 4.

In order to transport the main tape T again so as to reproduce and reprint the speeches or the like upon the endless tape 13, the reset button 23 is depressed so that the flip-flop circuit consisting of the transistors $Tr_4$ and $Tr_5$ is reversed, whereby the apparatus is set to the start condition described hereinbefore.

The student may imitate the speeches or the like after they are reproduced from the main tape T and may record his imitated speeches or the like upon the track $13_3$ of the auxiliary endless tape 13 during the time intervals $t_1'$, $t_2'$ and so on which are substantially equal to the time intervals of the speeches or the like upon the tape T.

It is seen that when the reproduce button is depressed, the student imitates the speeches or the like and that when he depresses the reset button, the speeches or the like on the tape T are reproduced again. Therefore it is possible for him that he may continue his learning without paying the attention to the timing of the switching of one speech or the like on the tape T to another. Since the speeches or the like previously reprinted upon the endless tape 13 may be erased, there is no fear that the undesired speeches or the like previously reprinted are reproduced in case of the repetitive endless tape or repetitive learning.

From the foregoing, it is seen that according to the present invention, the repetitive mode is set only after one speech or the like on the main tape has been reproduced so that the student is not required to pay attention to the timing of selection and that the missing of the recording or undesired recording will not occur. The student may continuously and repetitively learn a foreign language or the like by simple operation so that the effect of learning may be much improved.

What is claimed is:

1. A magnetic recording apparatus for use in learning or for use as a teaching machine by a student comprising in combination:

an endless magnetic recording medium having at least two tracks formed on the peripheral surface thereof;
    a magnetic tape upon which are recorded auditory teaching materials and control signals for each of said auditory teaching materials, the spacing between the two adjacent control signals being equal to the length of said endless recording medium;
    first drive means for transporting said magnetic tape at a predetermined speed;
    second drive means for transporting said endless magnetic recording medium at a predetermined speed;
    means for reprinting each of said auditory teaching materials recorded upon said magnetic tape upon one of the tracks of said endless magnetic recording medium while both of said magnetic tape and endless magnetic recording medium are being transported;
    means for reproducing the auditory teaching materials reprinted upon said one track of said endless magnetic recording medium;
    means for reading out said control signals and deactivating said first drive means and activating said reproducing means in response to said control signals read out;
    means for recording and reproducing an imitation upon and from the other track of said endless magnetic recording medium independently of the teaching materials, said imitation effected by the student being carried out with hearing and responding to the reproduced sound of the reprinted teaching material; and
    means selectively operable to deactivate said reading out means.

2. The magnetic recording apparatus as defined in claim 1 wherein said first drive means has a capstan and a pinch roller, said pinch roller is coupled to an electromagnet member so that when the latter is energized said pinch roller is pressed against said capstan.

3. The magnetic recording apparatus as defined in claim 1 wherein each of said auditory teaching materials recorded upon said magnetic tape has substantially the same length while the spacing between the two adjacent auditory teaching materials is left unrecorded and has the same length as that of said each of said auditory teaching materials and the length of each teaching material plus the length of said spacing are substantially the same as the length of said endless recording medium.

4. A magnetic recording apparatus for use in learning or for use as a teaching machine by a student comprising:

an endless magnetic recording medium;
    a magnetic tape upon which are recorded auditory teaching materials and control signals for said auditory teaching materials the spacing between two adjacent control signals being equal to the length of said endless recording medium;
    first drive means for transporting said magnetic tape at a predetermined speed;
    second drive means for transporting said endless magnetic recording medium at a predetermined speed;
    means for reprinting each of said auditory teaching materials recorded upon said magnetic tape upon said endless recording medium while both of said magnetic tape and endless magnetic recording medium are being transported;
    means for reproducing the auditory teaching materials reprinted on said endless magnetic recording medium;
    means for reading out said control signals and deactivating said first drive means and activating said reproducing means in response to said control signals read out;
    said reading out means having electro-magnetic transducing means drivingly connected to said first drive means; and
    means selectively operable for deactivating said reading out means, having memorizing means for memorizing the mode of said means selectively operable, an AND circuit electrically connected with an output of said memorizing means and said reading out means, said AND circuit being connected with said electro-magnetic transducing means; whereby the student can selectively operate the apparatus in a repetitive learning mode by reproducing the auditory teaching materials reprinted on the endless magnetic recording medium or in a non-repetitive learning mode by continuously driving the magnetic tape.

5. The magnetic recording apparatus as defined in claim 4, wherein said memorizing means is a flip-flop circuit which is coupled to said means for reading out said control signals.

* * * * *